(12) United States Patent
Wang et al.

(10) Patent No.: US 8,776,503 B2
(45) Date of Patent: Jul. 15, 2014

(54) METHOD AND APPARATUS FOR MONITORING A REDUCTANT INJECTION SYSTEM IN AN EXHAUST AFTERTREATMENT SYSTEM

(75) Inventors: Yue-Yun Wang, Troy, MI (US); Stephen Paul Levijoki, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 968 days.

(21) Appl. No.: 12/885,821

(22) Filed: Sep. 20, 2010

(65) Prior Publication Data
US 2012/0067031 A1 Mar. 22, 2012

(51) Int. Cl.
*F01N 3/20* (2006.01)

(52) U.S. Cl.
USPC ............................................. 60/295; 60/301

(58) Field of Classification Search
USPC ............................ 60/277, 286, 295, 301, 303
See application file for complete search history.

(56) References Cited

U.S. PATENT DOCUMENTS

| 6,138,638 | A  | * | 10/2000 | Morikawa ..................... 123/295 |
|-----------|----|---|---------|---------------------------------------|
| 6,662,553 | B2 |   | 12/2003 | Patchett et al. |
| 7,178,331 | B2 |   | 2/2007  | Blakeman et al. |
| 7,373,775 | B2 |   | 5/2008  | Breuer et al. |
| 7,426,825 | B2 |   | 9/2008  | Viola et al. |
| 2004/0040284 | A1 | | 3/2004 | Upadhyay et al. |
| 2004/0074229 | A1 | | 4/2004 | Upadhyay et al. |
| 2007/0044456 | A1 | | 3/2007 | Upadhyay et al. |
| 2009/0248361 | A1 | | 10/2009 | Franco et al. |
| 2010/0212417 | A1 | | 8/2010  | Crawford et al. |
| 2010/0251809 | A1 | * | 10/2010 | Migueis et al. ............. 73/114.51 |

FOREIGN PATENT DOCUMENTS

| EP | 2226480 A1 | | 9/2010 | |
| WO | WO2009000647 | * | 12/2008 | .............. F02D 41/38 |

OTHER PUBLICATIONS

Bosch, Kraftfahrtechnisches Taschenbuch. 23. Auflage. Wiesbaden: Friedr. Vieweg &Sohn Verlag/GWV Fachverlage GmbH, 2003. S. 64. ISBM 3-528-23876-3.
Horst Kuchling: Taschenbuch der Physik, 20. Auflage. Munchen: Fachbuchverlag Leipzig im Carl Hanser Verlag, 2011. S 254. -ISBN 978-3-446-42457-9.
U.S. Appl. No. 12/576,399, filed Oct. 2009, Wang et al.

* cited by examiner

*Primary Examiner* — Kenneth Bomberg
*Assistant Examiner* — Jonathan Matthias

(57) ABSTRACT

A reductant injector is configured to dispense a reductant into an exhaust gas feedstream of an internal combustion engine upstream of a selective catalytic reduction device. The reductant injector of a reductant injection system is monitored by generating injector pulsewidth commands corresponding to a prescribed reductant flowrate, monitoring the injector pulsewidth commands, verifying the prescribed reductant flowrate corresponds to the injector pulsewidth commands, monitoring a fluidic pressure in the reductant injection system, estimating a first injected quantity of the reductant corresponding to the injector pulsewidth commands, estimating a second injected quantity of the reductant corresponding to the fluidic pressure in the reductant injection system, and comparing the first and second injected quantities of reductant.

8 Claims, 4 Drawing Sheets

METHOD AND APPARATUS FOR MONITORING A REDUCTANT INJECTION SYSTEM IN AN EXHAUST AFTERTREATMENT SYSTEM

TECHNICAL FIELD

This disclosure pertains generally to exhaust aftertreatment systems for internal combustion engines.

BACKGROUND

The statements in this section merely provide background information related to the present disclosure and may not constitute prior art.

Known engine control strategies to improve fuel economy and reduce fuel consumption in internal combustion engines include operating at a lean air/fuel ratio. This includes engines configured to operate in compression-ignition and lean-burn spark-ignition combustion modes. Engines operating at lean air/fuel ratios may have increased combustion temperatures leading to increased NOx emissions.

A known exhaust aftertreatment system and control strategy for managing and reducing NOx emissions includes a reductant injection control system and an associated reductant-selective catalytic reduction device. The reductant injection control system injects a reductant, e.g., urea into an exhaust gas feedstream upstream of an ammonia-selective catalytic reduction device to reduce NOx molecules to nitrogen and oxygen. Known ammonia-selective catalytic reduction devices decompose urea to ammonia, and the ammonia reacts with the NOx molecules in the presence of a catalyst to produce nitrogen. Some amount of ammonia may be stored on the ammonia-selective catalytic reduction device, enabling continued reduction of the NOx molecules when the urea injection control system is not capable of dispensing a controlled amount of urea.

Known control systems include dispensing reductant at a rate that corresponds to concentrations of engine-out NOx emissions to achieve NOx reduction without using excess amounts of reductant, i.e., dispensing reductant at a reductant/NOx stoichiometric ratio.

SUMMARY

A reductant injector is configured to dispense a reductant into an exhaust gas feedstream of an internal combustion engine upstream of a selective catalytic reduction device. The reductant injector of a reductant injection system is monitored by generating injector pulsewidth commands corresponding to a prescribed reductant flowrate, monitoring the injector pulsewidth commands, verifying the prescribed reductant flowrate corresponds to the injector pulsewidth commands, monitoring a fluidic pressure in the reductant injection system, estimating a first injected quantity of the reductant corresponding to the injector pulsewidth commands, estimating a second injected quantity of the reductant corresponding to the fluidic pressure in the reductant injection system, and comparing the first and second injected quantities of reductant.

BRIEF DESCRIPTION OF THE DRAWINGS

One or more embodiments will now be described, by way of example, with reference to the accompanying drawings, in which.

DETAILED DESCRIPTION

Figure 1:
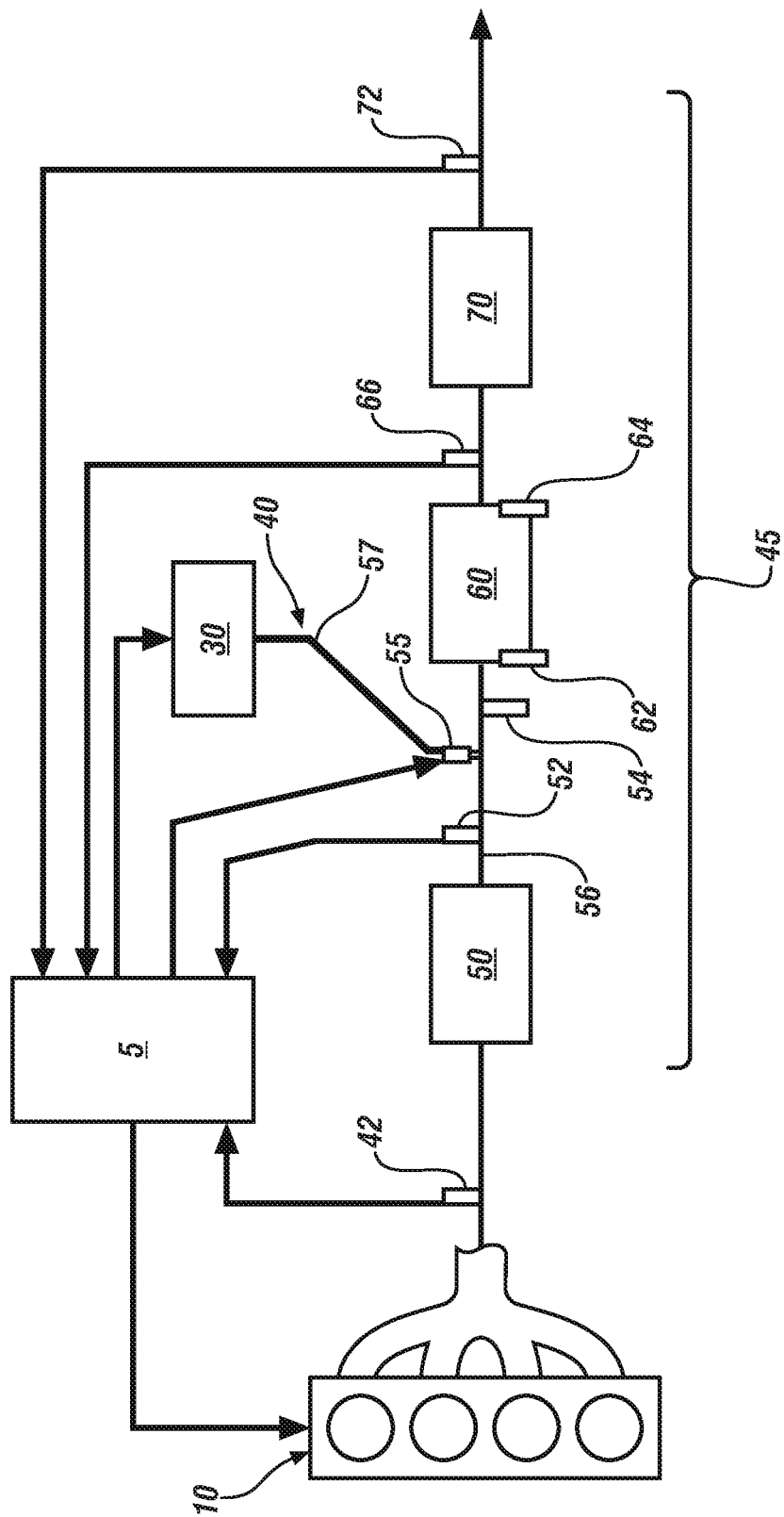
FIG. 1 is a schematic diagram of an engine and exhaust aftertreatment system in accordance with the present disclosure.

Referring now to the drawings, wherein the showings are for the purpose of illustrating certain exemplary embodiments only and not for the purpose of limiting the same, FIG. 1 schematically illustrates an internal combustion engine 10, an aftertreatment system 45, and an accompanying control system including a control module 5 that have been constructed in accordance with an embodiment of the disclosure. One exemplary engine 10 is a multi-cylinder direct-injection four-stroke internal combustion engine that operates primarily at a lean air/fuel ratio. The exemplary engine 10 may include a compression-ignition engine, a spark-ignition direction-injection engine, and other engine configurations that operate using a combustion cycle that includes lean operation.

The engine 10 is equipped with various sensing devices that monitor engine operation, including an exhaust gas sensor 42 configured to monitor the exhaust gas feedstream. The exhaust gas sensor 42 preferably is a device configured to generate a signal correlatable to air/fuel ratio of the exhaust gas feedstream, from which oxygen content may be determined. Alternatively or in addition, the exhaust gas sensor 42 may be a device configured to generate a signal correlatable to NOx concentration in the exhaust gas feedstream. Alternatively, a virtual sensing device executed as an algorithm in the control module 5 may be used as a substitute for the exhaust gas sensor 42, wherein NOx concentration in the exhaust gas feedstream is estimated based upon engine operating conditions including engine speed, mass fueling rate, and other factors. The engine 10 is preferably equipped with a mass air flow sensor to measure intake air flow, from which exhaust mass air flow may be determined. Alternatively or in combination, an algorithm may be executed to determine mass air flow through the engine 10 based upon engine rotational speed, displacement, and volumetric efficiency.

The control system includes the control module 5 that is signally connected to a plurality of sensing devices configured to monitor the engine 10, the exhaust gas feedstream, and the exhaust aftertreatment system 45. The control module 5 is operatively connected to actuators of the engine 10 and the exhaust aftertreatment system 45. The control system executes control schemes, preferably including control algorithms and calibrations stored in the control module 5, to control the engine 10 and the exhaust aftertreatment system 45. In operation the control system monitors operation of the internal combustion engine 10 and the exhaust aftertreatment system 45 and controls a reductant injection system 40 including a reductant delivery system 30 fluidly coupled to a reductant injector 55 via a tube 57 as described herein. The control system executes one or more control schemes to control the engine 10 to effect regeneration of the exhaust aftertreatment system 45.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control system includes control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The engine 10 is controlled to operate at a preferred air-fuel ratio to achieve performance parameters related to operator requests, fuel consumption, emissions, and driveability, with engine fueling and/or the intake air flow controlled to achieve the preferred air-fuel ratio.

The exhaust aftertreatment system 45 is fluidly coupled to an exhaust manifold of the engine 10 to entrain the exhaust gas feedstream. The exhaust aftertreatment system 45 includes a plurality of aftertreatment devices fluidly connected in series. In one embodiment, shown in FIG. 1, first, second, and third aftertreatment devices 50, 60 and 70 are fluidly connected in series using known pipes and connectors, including exhaust pipe 56 located between the first and second exhaust aftertreatment devices 50 and 60. Each of the exhaust aftertreatment devices 50, 60 and 70 includes a device that employs technologies having various capabilities for treating the constituent elements of the exhaust gas feedstream, including oxidation, selective catalytic reduction using a reductant, and particulate filtering. Design features for each of the aftertreatment devices 50, 60 and 70, e.g., volume, space velocity, cell density, washcoat density, and metal loading may be determined for specific applications. In the embodiment shown in FIG. 1, the first aftertreatment device 50 includes an oxidation catalyst, the second aftertreatment device 60 includes an ammonia-selective catalytic reactor device in one embodiment, and the third aftertreatment device 70 includes a catalyzed particulate filter, although the concepts described herein are not so limited. The first, second, and third aftertreatment devices 50, 60 and 70 may be assembled into individual structures that are fluidly connected and assembled in an engine compartment and a vehicle underbody with one or more sensing devices placed therebetween. One skilled in the art may conceive of other assembly configurations.

The first aftertreatment device 50 preferably includes an oxidation catalytic device that includes a cordierite substrate having an alumina-based washcoat containing one or more platinum-group metals, e.g., platinum or palladium. In one embodiment the first aftertreatment device 50 may be omitted.

The second aftertreatment device 60 includes the ammonia-selective catalytic reactor device in one embodiment, preferably a cordierite substrate coated with a washcoat. In one embodiment, the second aftertreatment device 60 includes two coated substrates arranged in series. The preferred washcoat uses one of Cu-Zeolite, Fe-Zeolite, and other metal-zeolite ammonia-selective catalytic technologies as catalytic material. In one embodiment the ammonia-selective catalytic reactor includes one type of metal ion and a suitable zeolite structure supported on a cordierite substrate.

The third aftertreatment device 70 preferably includes a second oxidation catalyst combined with a particulate filter. The third aftertreatment device 70 may further include, singly or in combination, other exhaust aftertreatment devices including catalyzed or uncatalyzed particulate filters, air pumps, external heating devices, sulfur traps, phosphorous traps, selective reduction devices, and others, according to specifications and operating characteristics of a specific engine and powertrain application.

The exhaust aftertreatment system 45 includes the reductant injection system 40 including the reductant injector 55 fluidly connected to the reductant delivery system 30 described with reference to FIG. 2. The reductant delivery system 30 and the reductant injector 55 are each controlled by the control module 5 to dispense a prescribed mass flowrate of the urea reductant into the exhaust gas feedstream upstream of the ammonia-selective catalytic reactor device 60.

Sensing devices related to monitoring the aftertreatment system 45 may include the exhaust gas sensor 42, a first sensing device 52 immediately downstream of the first aftertreatment device 50, a second sensing device 54 immediately upstream of the ammonia-selective catalytic reactor device 60, a third sensing device 66 downstream of the ammonia-selective catalytic reactor device 60, and a fourth sensing device 72 downstream of the third aftertreatment device 70. Sensing devices may further include first and second temperature monitoring sensors 62 and 64 configured to monitor temperatures related to the ammonia-selective catalytic reactor device 60. Alternatively or in addition a virtual sensing device may be used to monitor the aftertreatment system 45. A virtual sensing device may be executed as an algorithm in the control module 5 and substituted for a corresponding exhaust gas sensor. By way of example, NOx concentration in the exhaust gas feedstream may be estimated based upon engine operating conditions that are monitored using engine sensing devices. The described sensing devices related to monitoring the aftertreatment system 45 are meant to be illustrative.

The first sensing device 52 is located upstream of the second aftertreatment device 60, and is preferably configured to monitor temperature of the exhaust gas feedstream downstream of the first aftertreatment device 50. The first sensing device 52 generates a signal correlatable to temperature of the exhaust gas feedstream entering the ammonia-selective catalytic reactor device 60.

The second sensing device 54 is located immediately upstream of the ammonia-selective catalytic reactor device 60 and downstream of the reductant injector 55. The second sensing device 54 generates a signal correlatable to concentrations of specific gases, e.g., NOx, hydrocarbons, hydrogen cyanide, and/or acetaldehyde contained in the exhaust gas feedstream subsequent to exiting the first aftertreatment device 50.

The third sensing device 66 monitors the exhaust gas feedstream after the ammonia-selective catalytic reactor device 60 and upstream of the third aftertreatment device 70, and is preferably configured to monitor constituent elements of the exhaust gas feedstream, e.g., NOx concentration. The third sensing device 66 generates a signal correlatable to the NOx concentration of the exhaust gas feedstream, or another parameter (e.g., ammonia (NH3)).

The fourth sensing device 72 monitors the exhaust gas feedstream downstream of the third aftertreatment device 70, and is preferably configured to monitor constituent elements of the exhaust gas feedstream, e.g., NOx concentration. The fourth sensing device 72 generates a signal correlatable to NOx concentration or another exhaust gas constituent in the exhaust gas feedstream. Each of the first, second, third, and fourth sensing devices 52, 54, 66 and 72 are signally connected to the control module 5.

The first temperature monitoring sensor 62 measures temperature upstream of or within a front portion of the ammonia-selective catalytic reactor device 60 to determine an operating temperature thereof. The first temperature monitoring sensor 62 may be configured to monitor temperature of the exhaust gas feedstream, and alternatively may be configured to monitor temperature of the ammonia-selective catalytic reactor device 60.

The second temperature monitoring sensor 64 measures temperature downstream of or within a rearward portion of the ammonia-selective catalytic reactor device 60 to determine an operating temperature thereof. The second temperature monitoring sensor 64 may be configured to monitor temperature of the exhaust gas feedstream, and alternatively may be configured to monitor temperature of the ammonia-selective catalytic reactor device 60.

Figure 2:
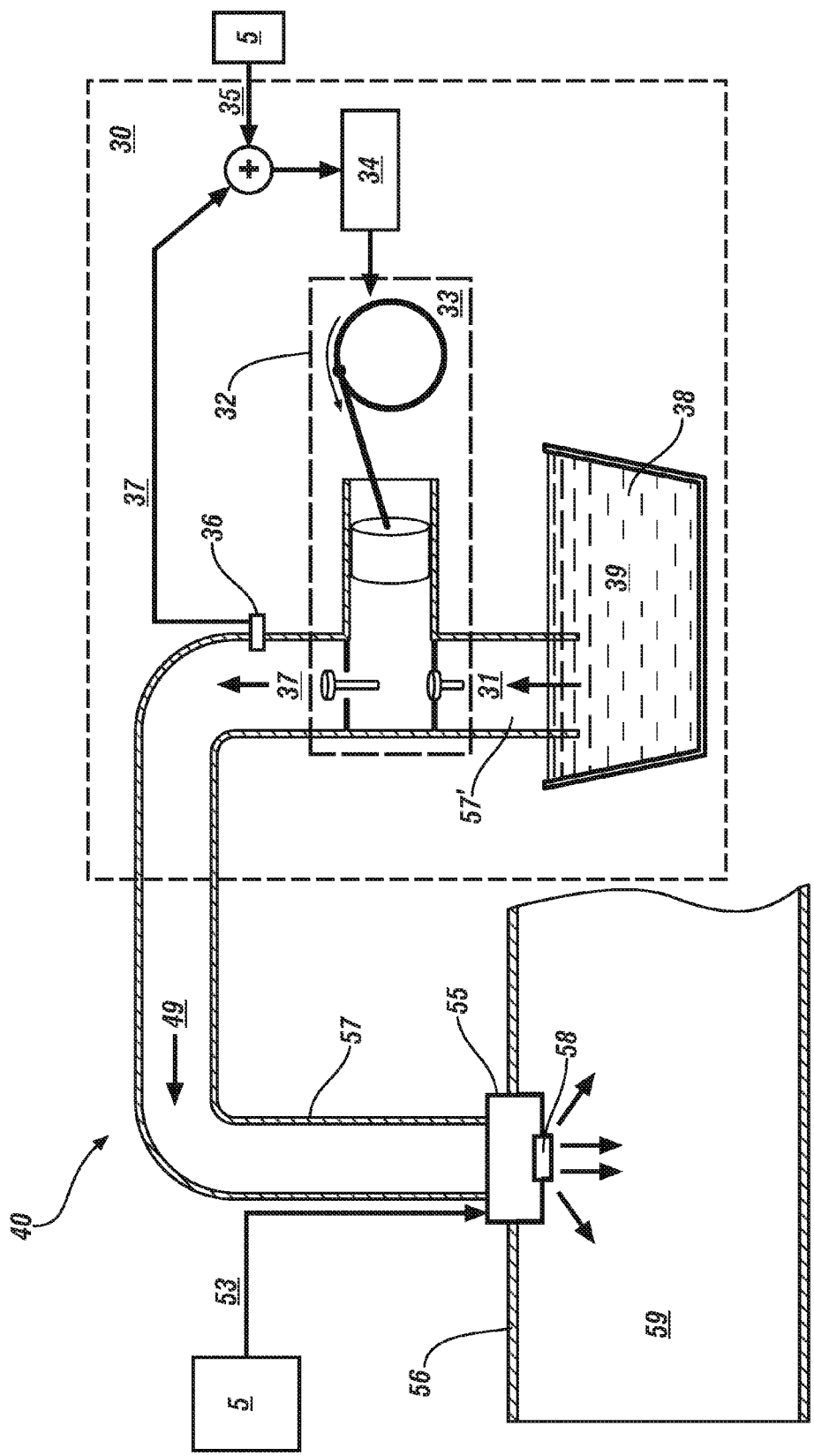
FIG. 2 is a schematic diagram of a urea injection system for an exhaust aftertreatment system in accordance with the present disclosure.

FIG. 2 shows details of the reductant injection system 40 including the reductant delivery system 30 and the reductant injector 55. The reductant injector 55 is configured to dispense the reductant via a nozzle 58 that is inserted into the exhaust pipe 56. The reductant injector 55 dispenses the reductant into the exhaust gas feedstream passing through the exhaust pipe 56. The nozzle 58 of the reductant injector 55 is inserted into the exhaust pipe 56 upstream of the ammonia-selective catalytic reactor device 60. Exhaust pressure 59 within the exhaust pipe 56 may be measured with an exhaust gas pressure sensor, or alternatively, may be estimated based upon engine operating conditions including the exhaust gas flowrate.

The reductant injector 55 fluidly connects to the reductant delivery system 30 via the tube 57 that carries pressurized reductant fluid thus providing a supply of pressurized reductant to the reductant injector 55. The reductant injector 55 is operatively connected to the control module 5, and preferably includes a solenoid-controlled fluid flow control valve fluidly coupled to the nozzle 58 that is inserted into the exhaust pipe 56 to inject the reductant into the exhaust gas feedstream. The control module 5 executes algorithmic code to monitor operating conditions of the engine 10 and operating parameters of the aftertreatment system 45 and determine a mass flowrate of the exhaust gas feedstream including a concentration and mass flowrate of NOx emissions. A prescribed reductant mass flowrate 49 is commanded. The prescribed reductant mass flowrate 49 preferably achieves a reductant/NOx stoichiometric ratio and provides sufficient mass flowrate of the reductant to reduce the concentration and mass flow of NOx emissions to nitrogen in the presence of the catalytic material of the ammonia-selective catalytic reactor device 60.

The control module 5 executes algorithmic code to generate an injector control signal, e.g., a pulsewidth-modulated control signal 53 to the reductant injector 55 at a commanded pressure in the tube 57 that corresponds to the prescribed reductant mass flowrate 49.

The reductant delivery system 30 includes a reductant pump 32 and associated pump control module 34 and a reductant storage tank 38 fluidly connected to an inlet tube 57' to the reductant pump 32. In one embodiment the reductant pump 32 includes a motor driven positive-displacement pump mechanism including a reciprocating piston contained in a housing having intake and outlet valves. Reciprocating motion of the piston is caused by an electrically-powered motor that is actuated by the pump control module 34. Reduction gearing between the motor and pump mechanism may provide a gear ratio for the pump. Reductant stored in the reductant storage tank 38 may be characterized in terms of a reductant temperature 39 and a reductant pressure 31, the reductant pressure 31 associated with inlet pressure to the reductant pump 32. Preferably the reductant delivery system 30 is configured such that there is gravity flow of reductant from the reductant storage tank 38 to the inlet of the reductant pump 32. The outlet of the reductant pump 32 fluidly connects to the tube 57 that carries pressurized reductant to the reductant injector 55. A pressure sensor 36 is configured to monitor reductant pressure 37 within the tube 57 in one embodiment. In operation, the control module 5 controls the reductant delivery system 30 to a preferred operating state, for example by generating a preferred pressure 35 for the reductant delivery system 30. A difference between the monitored reductant pressure 37 and the preferred pressure 35 within the tube 57 is determined, and sent to the pump control module 34, which generates a pump control signal for operating the reductant pump 32. The pump control module 34 controls operation of the reductant pump 32 in response to the pump control signal. A control parameter for the reductant pump 32 may include a pump control signal including one of a pump motor speed and a pump motor duty cycle 33 of the reductant pump 32. In one embodiment, the preferred pressure 35 is 6000 mbar (abs). The pump control module 34 may be separate from or integrated with the control module 5. Both the control module 5 and the pump control module 34 are part of the control system referred to herein.

During ongoing operation, the control module 5 executes a plurality of control schemes to control the reductant injection system 40 and the reductant injector 55 to dispense reductant into the exhaust gas feedstream at a prescribed reductant flowrate $\dot{U}_C$. This includes executing control schemes to monitor the reductant injector 55.

The reductant injection system 40 commands the reductant injector 55 to operate at a pulsewidth corresponding to the prescribed reductant flowrate. An element of monitoring the reductant injector 55 preferably includes verifying that the commanded injector pulsewidth corresponds to the urea injection command associated with the prescribed reductant flowrate. The commanded injector pulsewidths and the fluidic pressure in the reductant injection system 40 are coincidentally monitored, preferably over a predetermined period of time. A first estimate of the injected quantity of the reductant corresponding to the commanded injector pulsewidths over the predetermined period of time is calculated. A second estimate of the injected quantity of the reductant corresponding to the coincidentally monitored injector pressure is calculated. The first and second estimated injected quantities of reductant are compared, and a fault associated with the reductant injector 55 is identified when a difference between the first and second estimated injected quantities of the reductant exceeds a threshold. Subsequent remedial action can then be taken by the control system based on the detected fault including modification of the pump control signal for operating the reductant pump 32 and the pulsewidth-modulated control signal 53 for operating the reductant injector 55.

A control scheme verifies that the commanded injector pulsewidth corresponds to the urea injection command associated with the prescribed reductant flowrate, i.e., verifies that the commanded injector pulsewidth correctly matches the urea injection command corresponding to the prescribed reductant flowrate. This includes verifying that the prescribed reductant mass flowrate $\dot{U}_C$ correlates to the injector control signal, e.g., the pulsewidth-modulated control signal 53.

A physical relationship between a reductant mass flowrate $\dot{U}$ and the pulsewidth-modulated control signal 53 may be expressed as follows:

$$\dot{U} = f_{AREA}(PWM)\sqrt{2\frac{P}{RT_0}(P-P_{st})} \quad [1]$$

wherein $f_{AREA}(PWM)$ is an equivalent effective open area of the nozzle 58 of the reductant injector 55 calculated using and corresponding to the pulsewidth-modulated control signal 53;
P is the reductant pressure 37 within the tube 57;
$T_0$ is the reductant temperature 39;
$P_{st}$ is exhaust pressure 59 within the exhaust pipe 56 into which the nozzle 58 of the reductant injector 55 is inserted; and
R is the ideal gas constant.

Thus, the physical relationship expressed in Eq. 1 may be used to describe a relationship between a prescribed reductant mass flowrate $\dot{U}_C$ and the pulsewidth-modulated control signal 53 to verify that the pulsewidth-modulated control signal 53 correlates the commanded reductant mass flowrate 49, which is the prescribed reductant mass flowrate $\dot{U}_C$ as described herein.

One control scheme to verify that the pulsewidth-modulated control signal 53 correlates to the commanded reductant mass flowrate 49 may include evaluating a power density. Power density is a ratio of a time-based integration of the prescribed reductant mass flowrate $\dot{U}_C$ and a corresponding time-based integration of the equivalent effective open area of the nozzle 58 of the reductant injector 55 corresponding to the pulsewidth-modulated control signal 53, i.e., $f_{AREA}(PWM)$. In one embodiment the power density is calculated as follows:

$$\frac{\int f_{AREA}(PWM)\cdot Gain(T_0, P_{st})}{\int \dot{U}_c} \quad [2]$$

wherein $Gain(T_0, P_{st})$ is a scalar value corresponding to the reductant temperature 39 $T_0$ and the exhaust pressure 59 within the exhaust pipe 56, i.e., $P_{st}$. The magnitude of scalar values for $Gain(T_0, P_{st})$ may be predetermined using the relationship described in Eq. 1. The pulsewidth-modulated control signal 53 correlates to the commanded reductant mass flowrate 49 when the power density calculated using Eq. 2 is approximately equal to 1.0.

One control scheme to verify that the pulsewidth-modulated control signal 53 correlates to the commanded reductant mass flowrate 49 may include executing a PWM shape correlation check. The PWM shape correlation check includes calculating a statistical correlation between the equivalent effective open area of the nozzle 58 of the reductant injector 55 corresponding to the pulsewidth-modulated control signal 53, i.e., $f_{AREA}(PWM)$ multiplied by the $Gain(T_0, P_{st})$, and the prescribed reductant mass flowrate $\dot{U}_C$. The statistical correlation is preferably ongoingly calculated over a predetermined period of time as follows.

$$corr(f_{AREA}(PWM)\cdot Gain(T_0,P_{st}),\dot{U}_c)>0.8(\text{normal}) \quad [3]$$

The pulsewidth-modulated control signal 53 correlates to the commanded reductant mass flowrate 49 when the statistical correlation coefficient calculated using Eq. 3 is greater than 0.8 in one embodiment.

Operation of the reductant injector 55 is monitored only when it has been verified that the pulsewidth-modulated control signal 53 correlates to the commanded reductant mass flowrate 49, i.e., is within an allowable margin of error, preferably using the relationships as described herein above. The commanded injector pulsewidths and the injector pressure are coincidentally monitored, preferably over a predetermined period of time.

A first estimate Y1 of injected quantity of the reductant corresponding to the commanded injector pulsewidths over the predetermined period of time is calculated. This includes monitoring the pulsewidth-modulated control signal 53 and calculating an average value of the pulsewidth-modulated control signal 53 over a time period. In one embodiment the calculated average value of the pulsewidth-modulated control signal 53 is a moving average, expressed as $f_{MA}(PWM)$ and calculated using known statistical methods and taking into account factors related to cycle times and operation to remove errors. The calculated moving average of the pulsewidth-modulated control signal 53, i.e., $f_{MA}(PWM)$ is integrated as a function of time, which is expressed as follows:

$$Y1=A*\int f_{MA}(PWM)dt \quad [4]$$

wherein A is a scalar term. The time-integrated value of the calculated moving average of the pulsewidth-modulated control signal 53 is used to calculate the first estimate Y1 of the injected quantity of reductant using the relationship expressed in Eq. 1.

Figure 3:
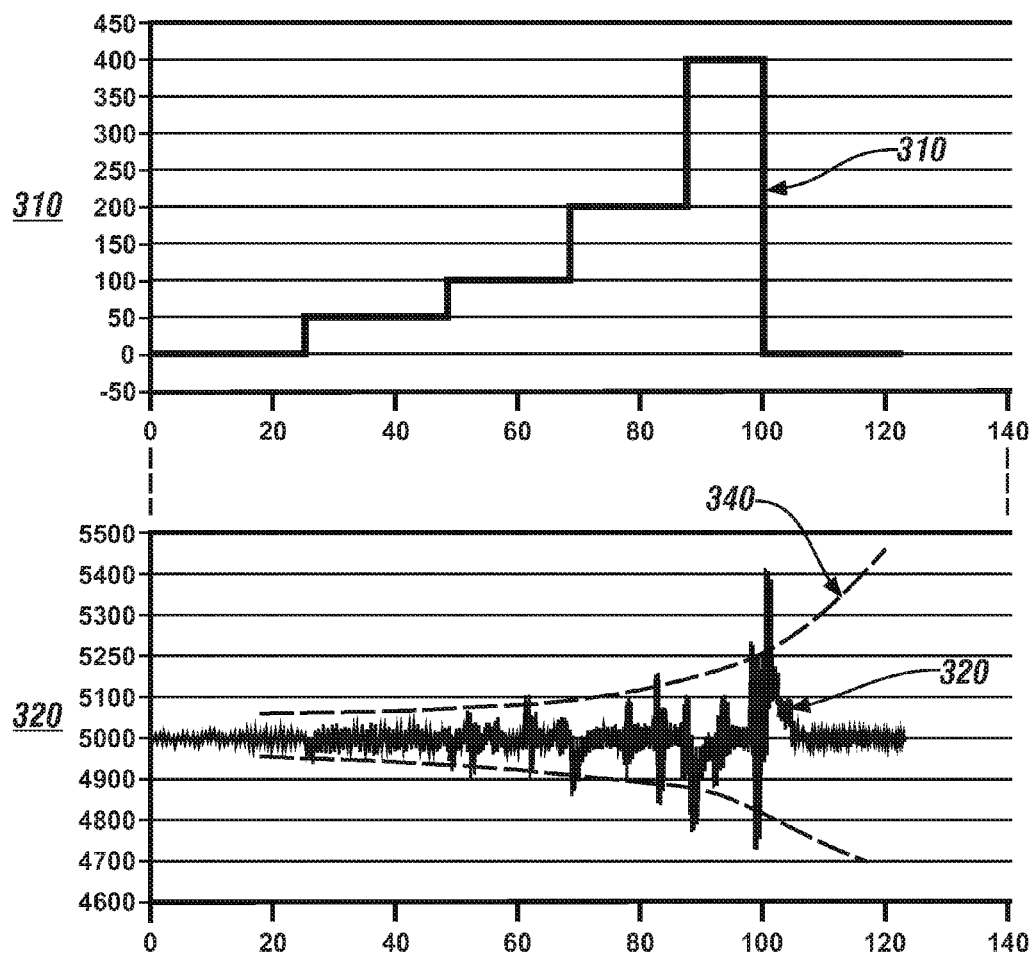
FIG. 3 graphically shows data associated with operating an exemplary reductant injection system, including a reductant mass flowrate and a time-correlated measurement of pressure in accordance with the present disclosure.

FIG. 3 graphically shows data associated with operating an exemplary reductant injection system 40, including a reductant mass flowrate 310 (in mg/s) plotted over an elapsed time (in sec.) 330 for a plurality of injector control signals, e.g., pulsewidth-modulated control signals 53. The data also includes a time-correlated measurement of pressure 320, i.e., the pressure 37 within the tube 57 of the reductant injection system 40. A calculated pressure variance 340 corresponding to the time-correlated measurement of pressure 320 is shown. The data indicates that there is a relationship between the reductant mass flowrate 310 and the calculated pressure variance 340. As depicted, the calculated pressure variance 340 increases with an increase in the reductant mass flowrate 310. This relationship allows a correlation to be established between a pulsewidth-modulated control signal 53 and the variance in the pressure 37 within the tube 57 of the reductant injection system 40 for an exemplary system constructed as described herein.

The second estimate Y2 of injected quantity of the reductant corresponding to the coincidentally monitored injector pressure may be calculated using the relationship between the pulsewidth-modulated control signal 53 and a variance in the pressure 37 within the tube 57 of the reductant injection system 40. This includes monitoring the pressure 37 within the tube 57 of the reductant injection system 40 and ongoingly calculating a pressure error $\Delta p$, which is an arithmetic difference between the aforementioned preferred pressure 35 and the monitored reductant pressure 37 within the tube 57.

A standard deviation of the pressure error Δp is calculated and used to calculate a corrected standard function f(t) for reductant mass flowrate as follows:

$$f(t)=\text{std}(\Delta p)*\text{Gain}(\text{PWM}) \quad [5]$$

wherein std(Δp) is the standard deviation of the pressure error Δp; and

Gain(PWM) is a scalar value derived from the relation depicted in FIG. 3 to convert the variance in the pressure 37 within the tube 57 of the reductant injection system 40 to a correlated reductant mass flowrate.

The corrected standard function f(t) for the reductant mass flowrate is integrated over time, which is expressed as follows.

$$Y2=\int f(t)dt \quad [6]$$

The time-integrated value of the corrected standard function f(t) for the reductant mass flowrate is used to determine the second estimate Y2 of injected quantity of the reductant corresponding to the coincidentally monitored pressure 37 within the tube 57 of the reductant injection system 40.

The first and second estimated injected quantities of reductant, i.e., Y1 and Y2, respectively, are compared, and a fault associated with the reductant injector 55 is identified when a difference between the first and second injected quantities of the reductant exceeds a threshold.

Figure 4:
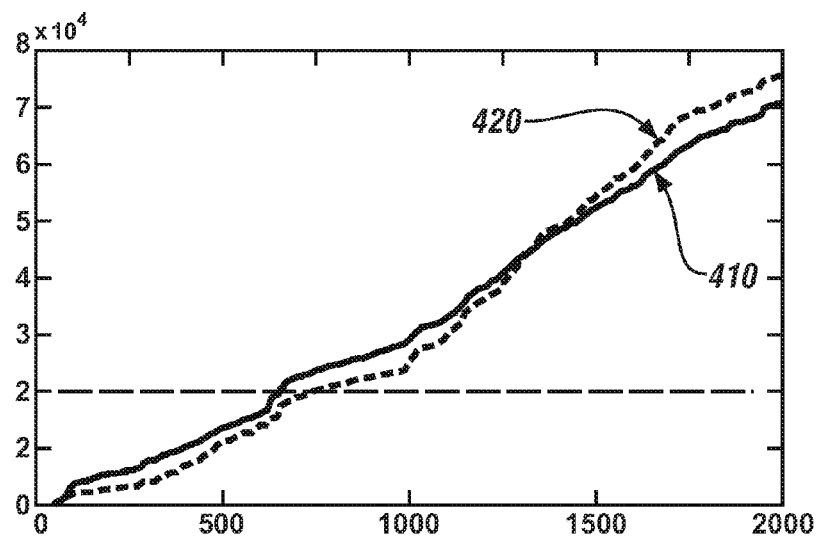
FIG. 4 graphically shows first and second estimates of the injected quantity of reductant plotted as a function of elapsed time for an exemplary system in accordance with the present disclosure.

FIG. 4 graphically shows first and second estimates Y1 410 and Y2 420, respectively, of the injected quantity of reductant plotted as a function of elapsed time 430 for an exemplary reductant injection system 40. As previously described, a fault associated with the reductant injector 55 may be identified when a difference between the first and second estimates Y1 410 and Y2 420, respectively, of the injected quantity of reductant exceeds a threshold.

Figure 5:
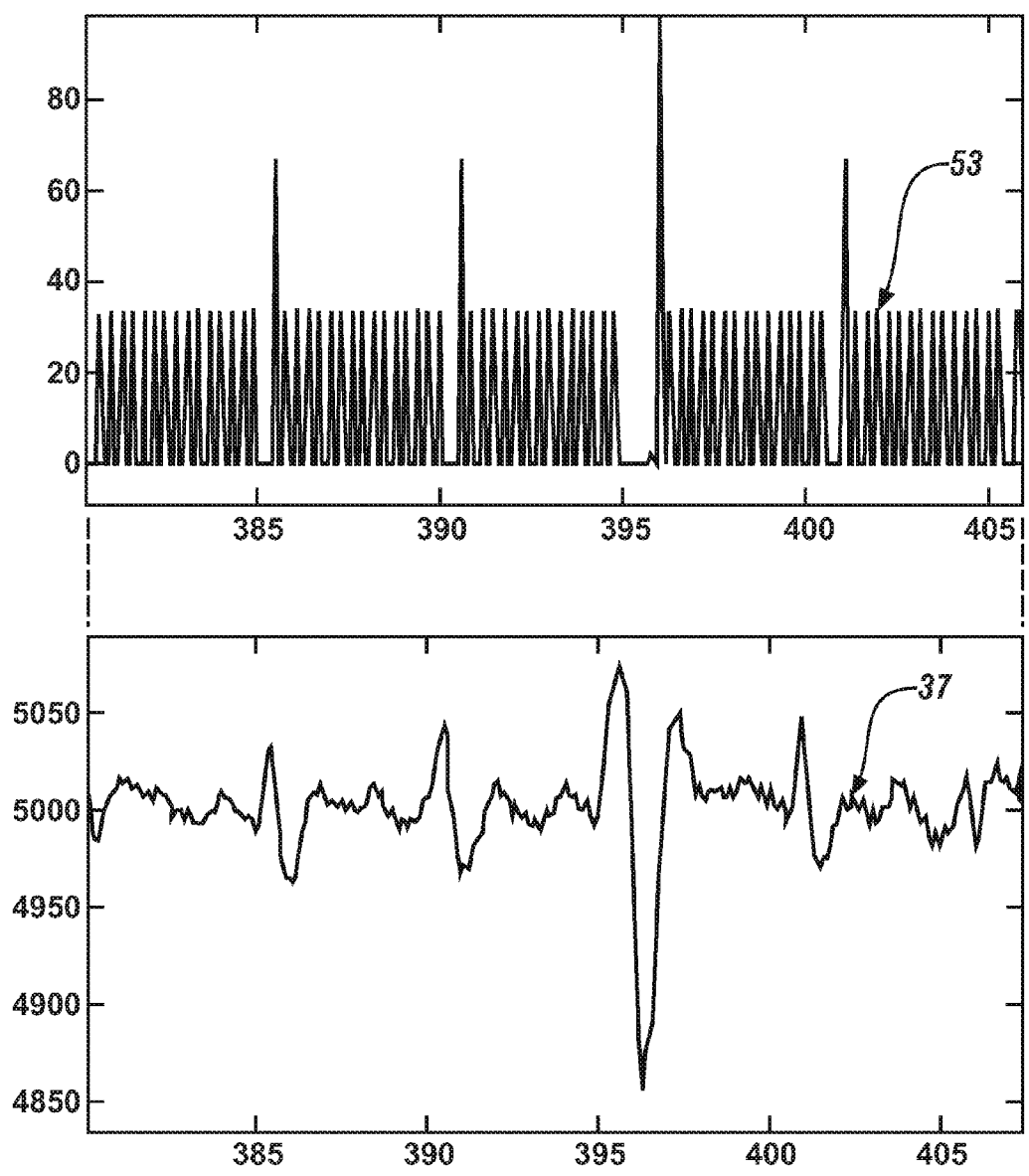
FIG. 5 graphically shows an injector duty cycle and corresponding reductant pressure plotted as a function of elapsed time for an exemplary system in accordance with the present disclosure.

FIG. 5 graphically shows an injector duty cycle 53 and corresponding reductant pressure 37 within the tube 57 plotted as a function of elapsed time 330 for an embodiment of the system described herein. Initially, the system is operating at a fixed PWM duty of about 38%. As indicated at various points on the graph, a decrease in the injector duty cycle 53 results in a corresponding increase in the reductant pressure 37 within the tube 57, and an increase in the injector duty cycle 53 results in a corresponding decrease in the reductant pressure 37 within the tube 57. Each change in the injector duty cycle 53 also results in a ripple effect on the reductant pressure 37 within the tube 57. Thus, the injector duty cycle 53 may be used to calculate the first estimate Y1 of injected quantity of the reductant.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System to dispense a reductant into an exhaust gas feedstream of an internal combustion engine upstream of a selective catalytic reduction device, comprising:
    a source of pressurized reductant;
    a reductant injector configured to receive the pressurized reductant and dispense the reductant into the exhaust gas feedstream;
    a pressure sensor configured to monitor pressure of the pressurized reductant; and
    a controller configured to:
    provide injector pulsewidth commands corresponding to a prescribed reductant flowrate to the reductant injector,
    monitor the pressure sensor,
    estimate a first injected quantity of the reductant corresponding to the injector pulsewidth commands,
    estimate a second injected quantity of the reductant corresponding to the pressure of the pressurized reductant,
    compare the first and second injected quantities of reductant, and
    detect a fault associated with the reductant injector when a difference between the first and second injected quantities of the reductant exceeds a threshold;
    wherein comparing the first and second injected quantities of reductant comprises calculating an expected reductant flowrate corresponding to an equivalent effective open area of a nozzle of the reductant injector corresponding to the injector pulsewidth commands, the pressure of the pressurized reductant, and a temperature of the reductant; and calculating a ratio of an integration of the prescribed reductant flowrate and a coincident integration of the equivalent effective open area of a nozzle of the reductant injector.

2. Method for monitoring a reductant injector of a reductant injection system, the reductant injector configured to dispense a reductant into an exhaust gas feedstream of an internal combustion engine upstream of a selective catalytic reduction device, comprising:
    in a controller:
        generating injector pulsewidth commands corresponding to a prescribed reductant flowrate;
        monitoring the injector pulsewidth commands;
        verifying the prescribed reductant flowrate corresponds to the injector pulsewidth commands;
        monitoring a fluidic pressure in the reductant injection system;
        estimating a first injected quantity of the reductant corresponding to the injector pulsewidth commands;
        estimating a second injected quantity of the reductant corresponding to the fluidic pressure in the reductant injection system; and
        comparing the first and second injected quantities of reductant;
    wherein verifying the prescribed reductant flowrate corresponds to the injector pulsewidth commands comprises calculating an expected reductant flowrate corresponding to an equivalent effective open area of a nozzle of the reductant injector corresponding to the injector pulsewidth commands, the fluidic pressure in the reductant injection system, and a temperature of the reductant; and calculating a ratio of an integration of the prescribed reductant flowrate and a coincident integration of the equivalent effective open area of the nozzle of the reductant injector.

3. Method for monitoring a reductant injector of a reductant injection system, the reductant injector configured to dispense a reductant into an exhaust gas feedstream of an internal combustion engine upstream of a selective catalytic reduction device, comprising:
    in a controller:
        generating injector pulsewidth commands corresponding to a prescribed reductant flowrate;
        monitoring the injector pulsewidth commands;
        verifying the prescribed reductant flowrate corresponds to the injector pulsewidth commands;

monitoring a fluidic pressure in the reductant injection system;

estimating a first injected quantity of the reductant corresponding to the injector pulsewidth commands;

estimating a second injected quantity of the reductant corresponding to the fluidic pressure in the reductant injection system; and comparing the first and second injected quantities of reductant;

wherein estimating the first injected quantity of the reductant corresponding to the injector pulsewidth commands comprises: calculating a moving average of the injector pulsewidth commands; integrating the moving average of the injector pulsewidth commands; and estimating the first injected quantity of the reductant corresponding to the injector pulsewidth commands comprises: calculating a moving average of the injector pulsewidth commands; integrating the moving average of the injector pulsewidth commands; and estimating the first injected quantity of the reductant based upon the integrated moving average of the injector pulsewidth commands comprising using a physical relationship between a reductant flow rate $\dot{U}$ and the injector pulsewidth commands in accordance with the following relationship:

$$\dot{U} = f_{AREA}(PWM)\sqrt{2\frac{P}{RT_0}(P-P_{st})}$$

wherein $f_{AREA}(PWM)$ is an equivalent effective open area of a nozzle of the reductant injector corresponding to the injector pulsewidth commands, P is the fluidic pressure in the reductant injection system, $T_0$ is a temperature of the reductant, $P_{st}$ is an exhaust pressure within an exhaust pipe into which the reductant injector is inserted, and R is an ideal gas constant.

4. The method of claim 3, further comprising detecting a fault associated with the reductant injector when a difference between the first and second injected quantities of the reductant exceeds a threshold.

5. The method of claim 3, wherein estimating the second injected quantity of the reductant corresponding to the fluidic pressure in the reductant injection system comprises:

analyzing a variance of the fluidic pressure in the reductant injection system; and estimating the second injected quantity of reductant corresponding to a magnitude of the variance of the fluidic pressure in the reductant injection system.

6. The method of claim 3, wherein verifying the prescribed reductant flowrate corresponds to the injector pulsewidth commands comprises calculating an expected reductant flowrate corresponding to an equivalent effective open area of a nozzle of the reductant injector corresponding to the injector pulsewidth commands, the fluidic pressure in the reductant injection system, and a temperature of the reductant.

7. The method of claim 3, wherein verifying the prescribed reductant flowrate corresponds to the injector pulsewidth commands comprises calculating a statistical correlation between an equivalent effective open area of a nozzle of the reductant injector corresponding to the injector pulsewidth commands and the prescribed reductant flowrate.

8. Method for monitoring a reductant injector of a reductant injection system configured to dispense a reductant into an exhaust gas feedstream upstream of a selective catalytic reduction device, comprising:

in a controller:

generating injector pulsewidth commands corresponding to a prescribed reductant flowrate;

monitoring the injector pulsewidth commands;

monitoring a fluidic pressure in the reductant injection system;

estimating a first injected quantity of the reductant corresponding to the injector pulsewidth commands;

estimating a first injected quantity of reductant using a physical relationship between a reductant flowrate $\dot{U}$ and the injector pulsewidth commands in accordance with the relationship:

$$\dot{U} = f_{AREA}(PWM)\sqrt{2\frac{P}{RT_0}(P-P_{st})}$$

wherein $f_{AREA}(PWM)$ is an equivalent effective open area of a nozzle of the reductant injector corresponding to the injector pulsewidth commands, P is the fluidic pressure in the reductant injection system, $T_0$ is a temperature of the reductant, $P_{st}$ is an exhaust pressure within an exhaust pipe into which the reductant injector is inserted, and R is an ideal gas constant;

analyzing a variance of the fluidic pressure in the reductant injection system;

estimating a second injected quantity of reductant corresponding to a magnitude of the variance of the fluidic pressure in the reductant injection system;

comparing the first and second injected quantities of reductant; and detecting a fault associated with the reductant injector when a difference between the first and second injected quantities of the reductant exceeds a threshold.

* * * * *